2278X
F. Tomlinson.
Domestic Boiler.
Patented Mar. 7. 1815.
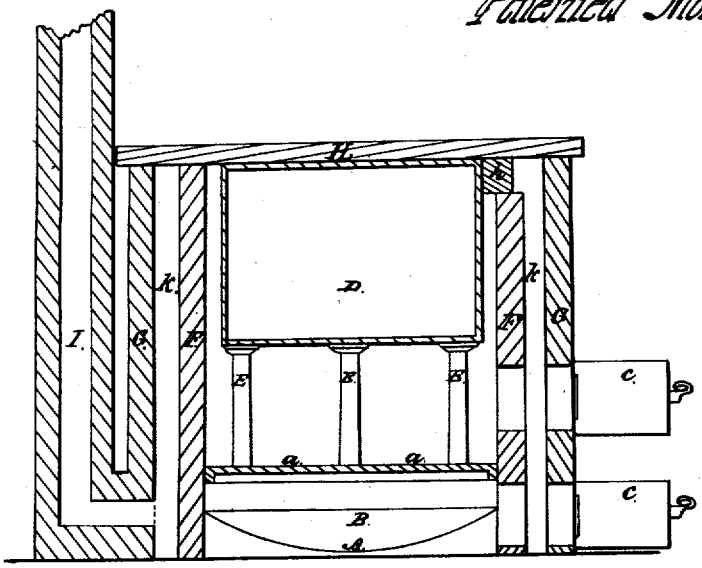
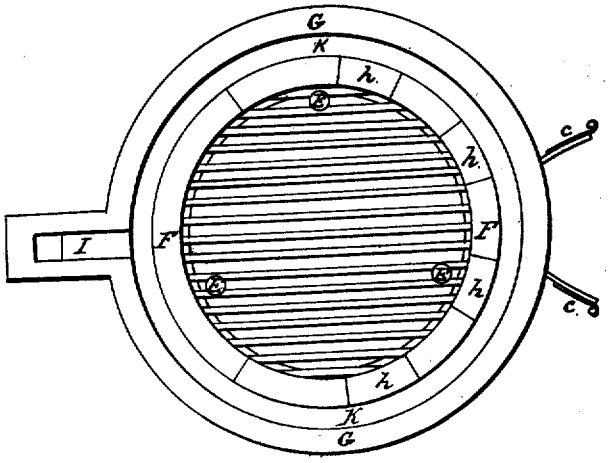

Mar 7 1813
March

Peter Tomlinson
Letters Patent

2278X

The Schedule referred to in these Letters Patent and making part of the same containing a description in the words of the said Peter Tomlinson himself of his mode of constructing Furnaces & Stove pluggs

---

The bottom of the improved furnace is in the form of a shallow bowl with an Iron grating in the centre over an ash pit. with suitable doors above & below the grating. the boiler is supported on three or more pillars of cast iron brick or suitable stone leaving a hollow space around the pillars between the bottom of the furnace & the boiler, extending under the whole bottom of the boiler. The inner wall of the furnace is then raised with brick or suitable stone up the sides of the boiler concentrick therewith & surrounding the same at the distance of about one inch leaving a space all round the boiler of one inch for the passage of the heat & flame in its ascent & is not to come in contact with the boiler. The sides thus surrounding the boiler are raised nearly to the top about four inches thick, thus forming an inner or partition wall. Another wall of brick is then raised so as to surround the first at the distance of about three inches in all parts leaving a space of about 3 inches between the first described partition wall & the outer wall of the furnace. Over the whole is a top of thin stone or cast iron, fitting close & tight to the boiler & the outward wall & resting on piers on the inner wall so as to leave communications for the passage of the flame & smoke between the inner & outer vacant space except about one third round the boiler near the funnel or chimney where the communication is cut off by carrying the inner partition up to the cover. The cover can at any time be removed so as to sweep or cleanse the passages when foul. A chimney or funnel is to be erected on one side so as to communicate with the bottom of the exterior vacant space to carry off the smoke. The effect of this furnace is that when the fire is placed on the grate the flame and heat ascend without obstruction upon the bottom & up the sides,

2278X of the boiler to which they are closely confined spreading equally over the surface thereof to the top of the furnace & then passing the interstices in the top of the partition wall descend through the other space on the other side of the same partition spreading the whole force of the heat on the boiler & partition & is carried off by the chimney & [illegible] of heat, the partition wall is thus heated by the flame ascending on one side & descending on the other & by the exclusion of the external cold air is kept hot a long time & communicates a continued & uniform heat to the boiler after the fire is extinguished. (The principle of this improvement or invention is to confine & spread the heat uniformly over the greatest portion possible of the boiler & to retain it in contact or in the cavities of the furnace till exhausted there- by making the operation shorter & more effectual with a great saving of fuel.) The advantages of this improvement in the furnace are great saving of fuel & labour, the preservation of the boiler. security from accident by fire & by the uniform distribution of heat when thus applied to Stills - an improvement in the quality of the spirits produced. This method of constructing furnaces is equally applicable to boilers used for Steam engines both horizontal & perpendicular. It is particularly adapted to Caboses & Coppers on board of Ships & Vessels. It is also applicable to ovens which may erected and heated in this manner with great conveniency & effect)

Peter Tomlinson

[illegible] Witnesses

[illegible] Simeon Baldwin

Horace Mills

[illegible]